United States Patent
Hans et al.

(10) Patent No.: US 10,391,908 B2
(45) Date of Patent: Aug. 27, 2019

(54) HEADREST

(71) Applicant: GRAMMER AG, Amberg (DE)

(72) Inventors: Juergen Hans, Cologne (DE); Detlef Schulz-Lekies, Mettmann (DE)

(73) Assignee: GRAMMER AG, Amberg (DE)

( * ) Notice: Subject to any disclaimer, the term of this patent is extended or adjusted under 35 U.S.C. 154(b) by 308 days.

(21) Appl. No.: 15/231,867

(22) Filed: Aug. 9, 2016

(65) Prior Publication Data

US 2017/0088024 A1 Mar. 30, 2017

(30) Foreign Application Priority Data

Sep. 25, 2015 (DE) .................. 10 2015 012 411

(51) Int. Cl.
*B60N 2/818* (2018.01)
*B60N 2/809* (2018.01)
*B60N 2/897* (2018.01)

(52) U.S. Cl.
CPC ............. *B60N 2/818* (2018.02); *B60N 2/809* (2018.02); *B60N 2/897* (2018.02)

(58) Field of Classification Search
CPC ................. B60N 2/818; B60N 2/809
USPC ............ 297/397–402, 410, 216.12
See application file for complete search history.

(56) References Cited

U.S. PATENT DOCUMENTS

| 8,313,148 | B2 | 11/2012 | Lardies |
| 9,346,383 | B2 | 5/2016 | Martin |
| 2006/0214492 | A1 | 9/2006 | Hassler |

FOREIGN PATENT DOCUMENTS

| DE | 19632561 A1 * | 2/1998 | ............ B60N 2/888 |
| DE | 102008064462 U | 6/2010 | |
| WO | 2014023843 A | 2/2014 | |

* cited by examiner

*Primary Examiner* — Syed A Islam
(74) *Attorney, Agent, or Firm* — Andrew Wilford

(57) ABSTRACT

A head rest is illustrated and described that has a head box (11) by which at least one support rod (12) can be secured to a vehicle seat, wherein at least one end of the support rod (12) is received in a bearing (14) carried on the head box (11) or the vehicle seat, wherein the support rod (12) can be latched releasably to at least one bearing (14) by a latch (15) movable between a latching position and a release position, wherein the latch (15) has at least one notch (16) that extends over a region of the circumference of the support rod (12) and has a latch element (17) carried by the bearing (14). The special feature is that the latch element (17) is movably mounted, so that in the latching position, in the event of a relative rotation between the support rod (12) and the bearing (14), it is movable out of a starting position into at least one crash position.

6 Claims, 7 Drawing Sheets

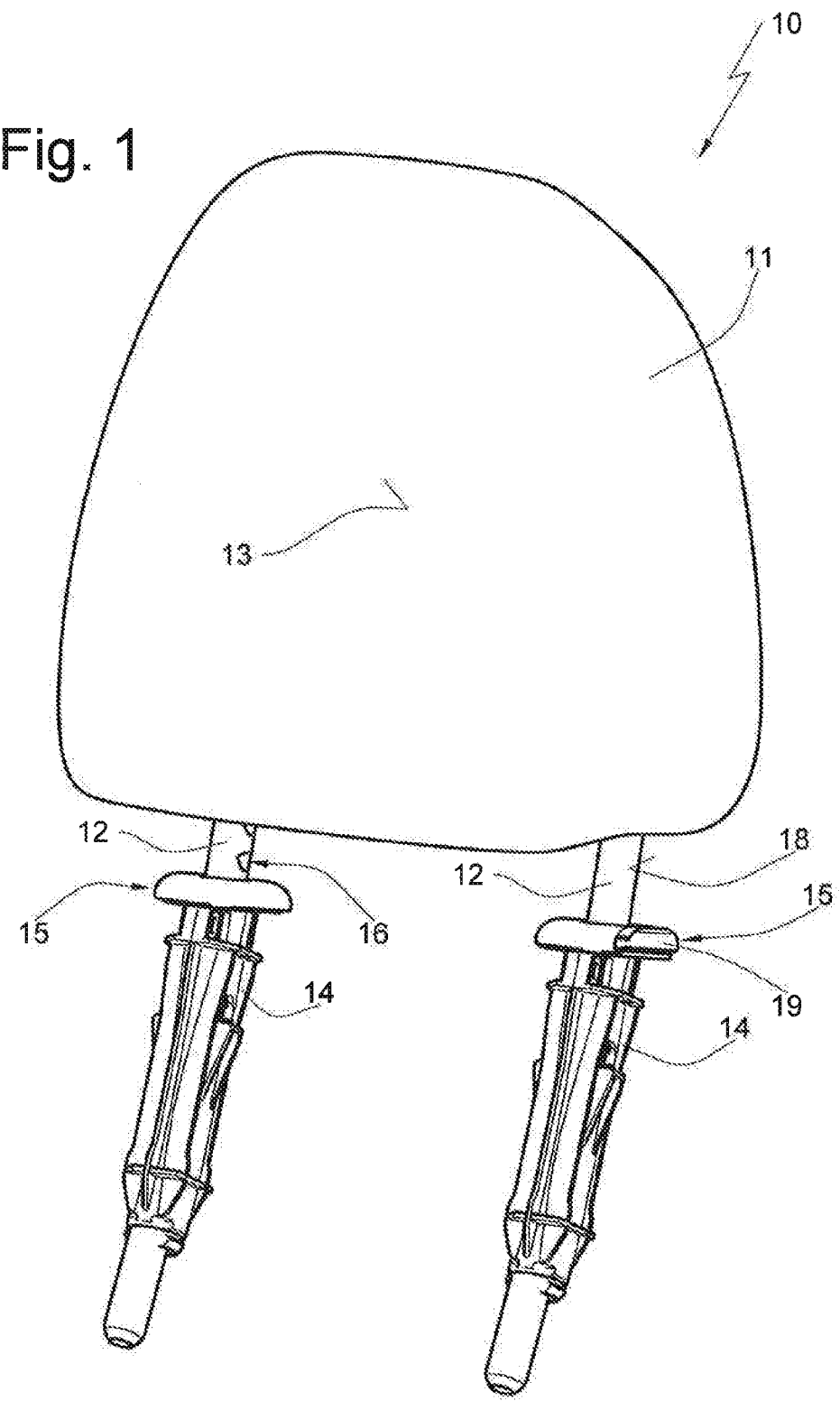

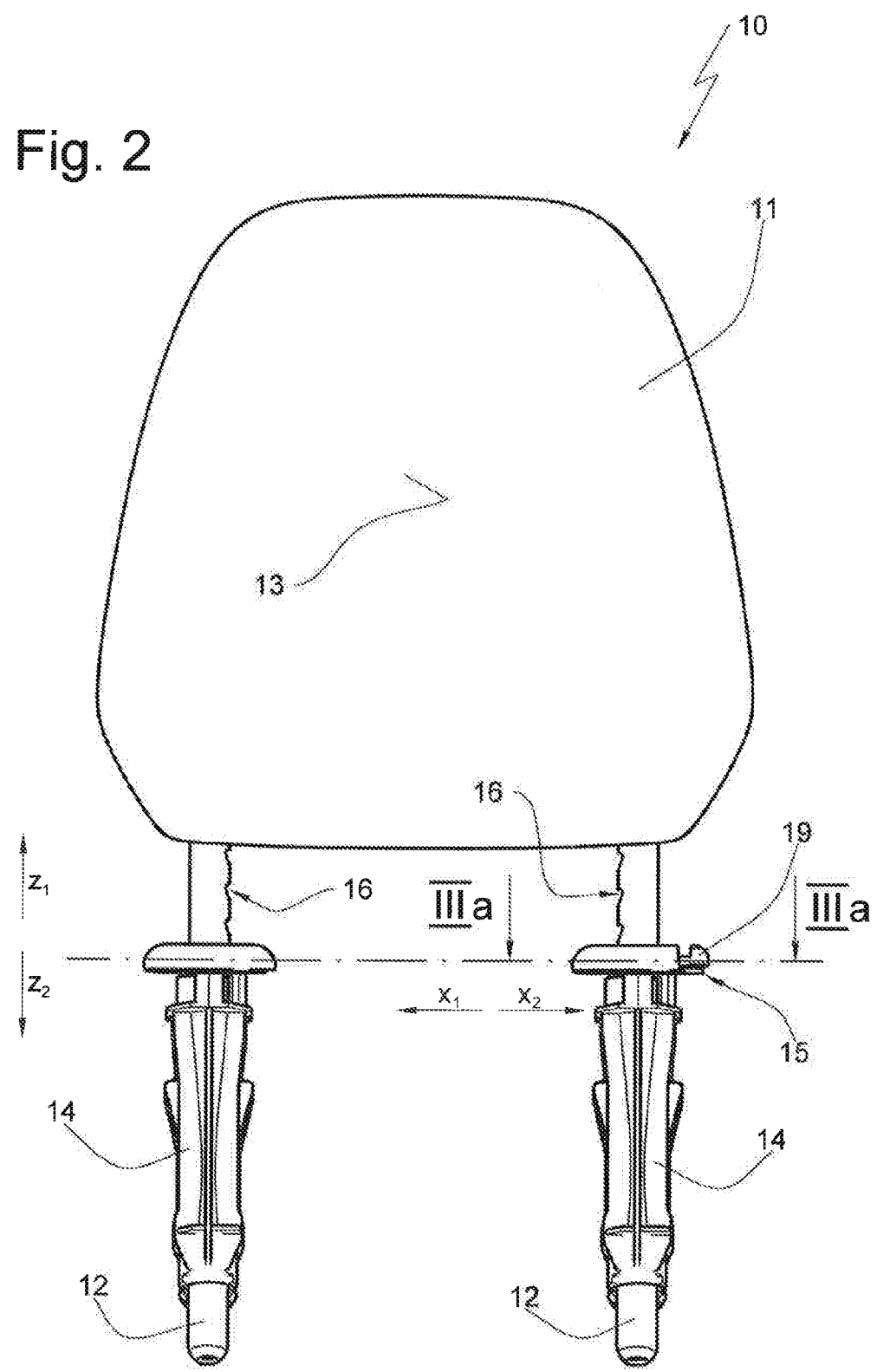

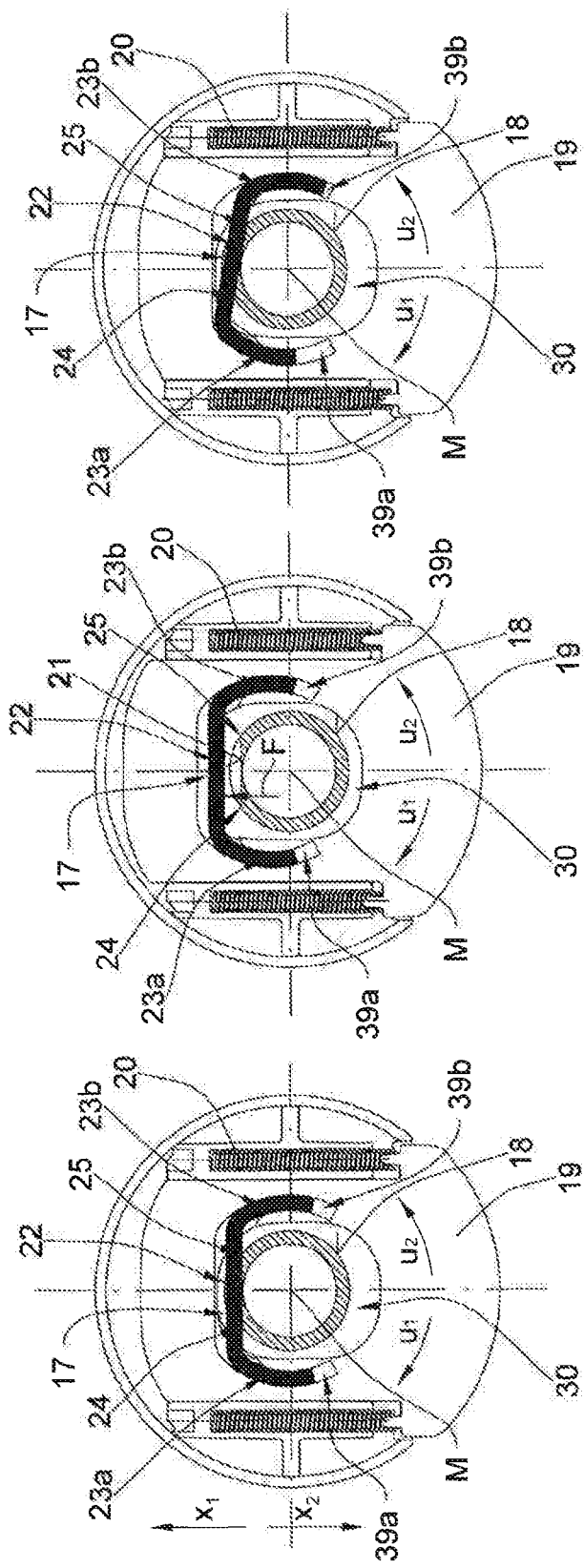

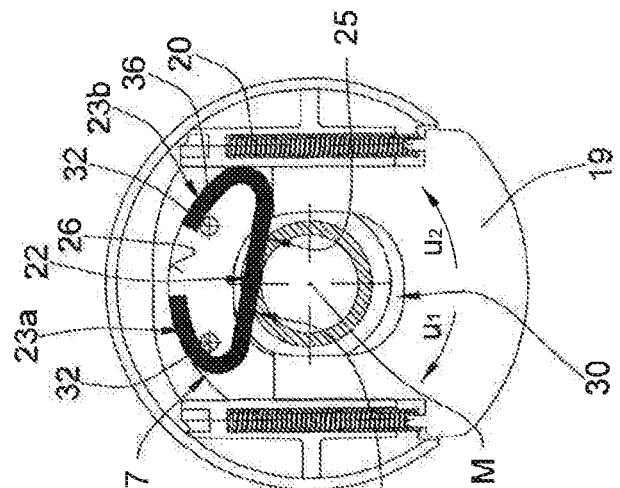
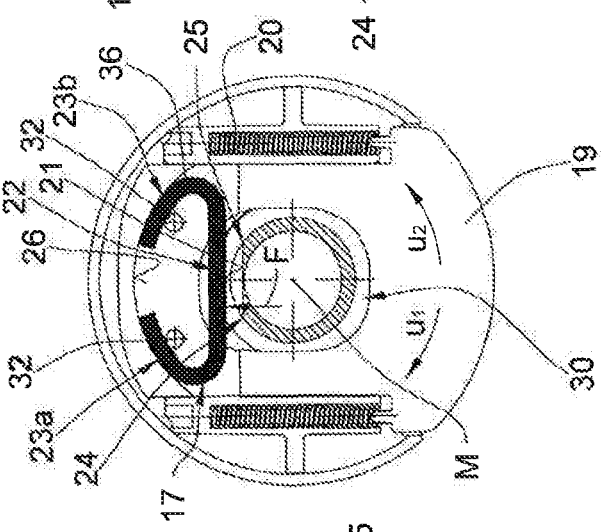
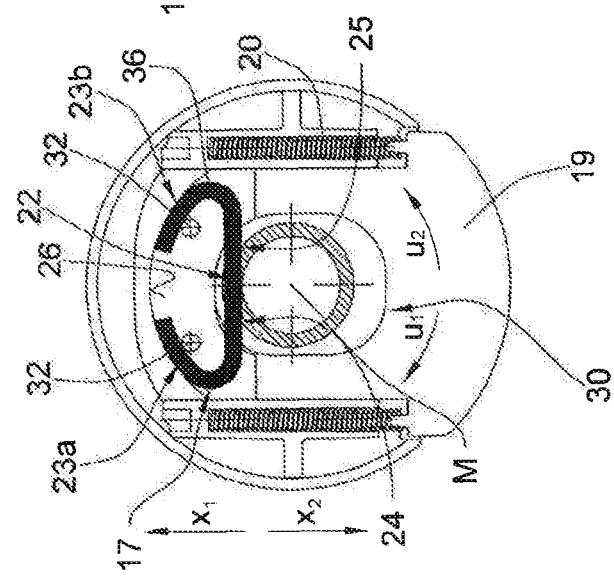

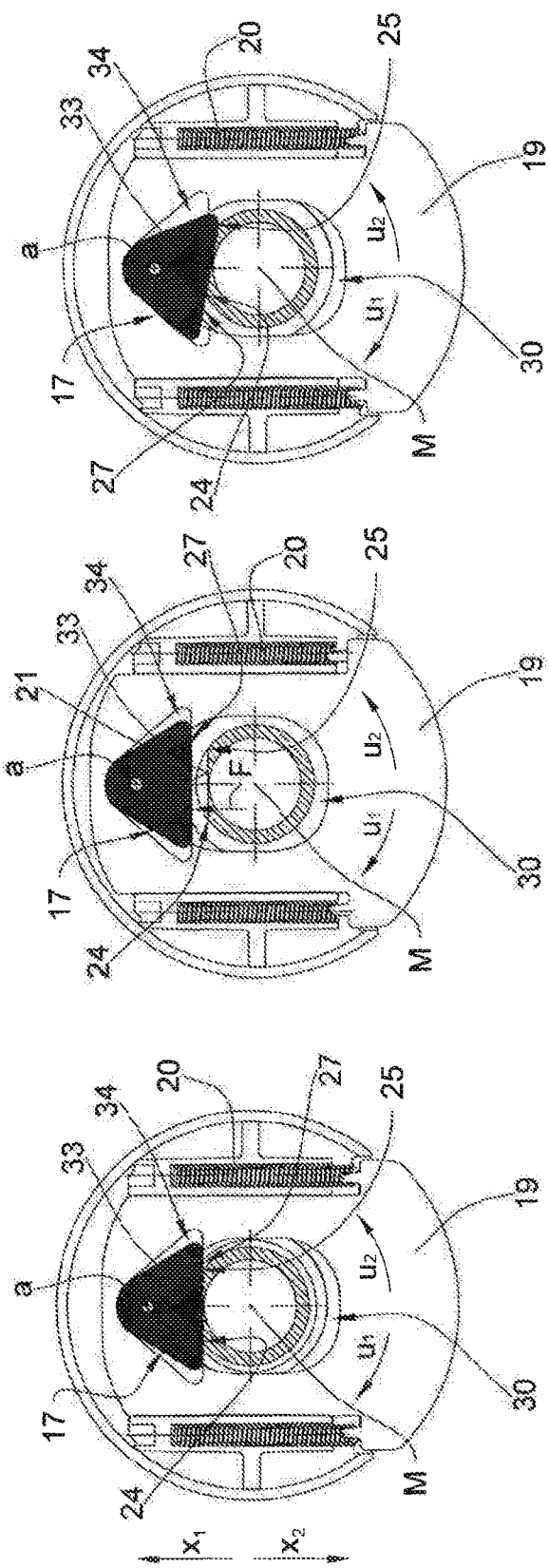

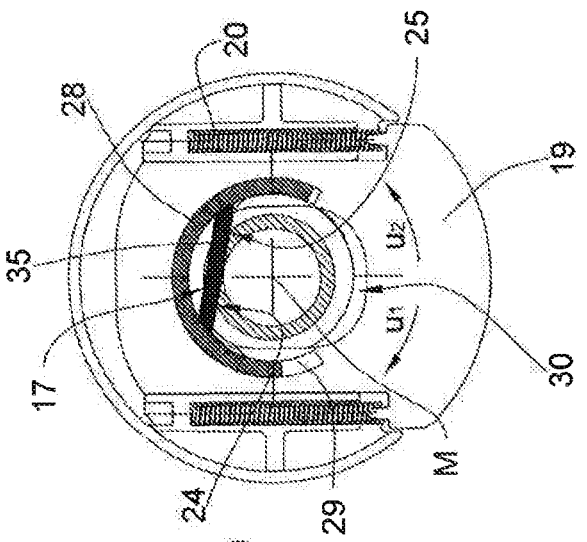
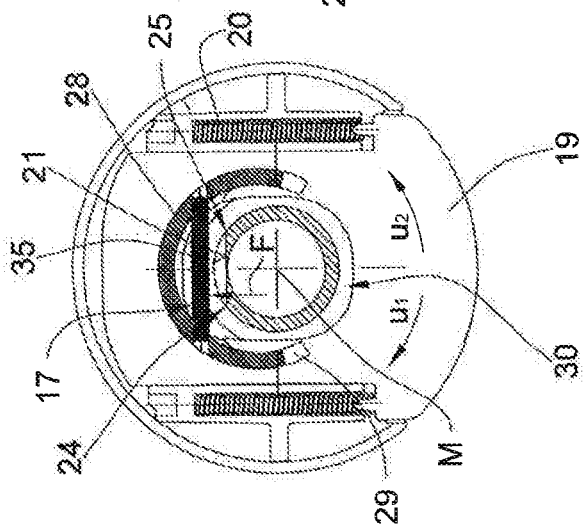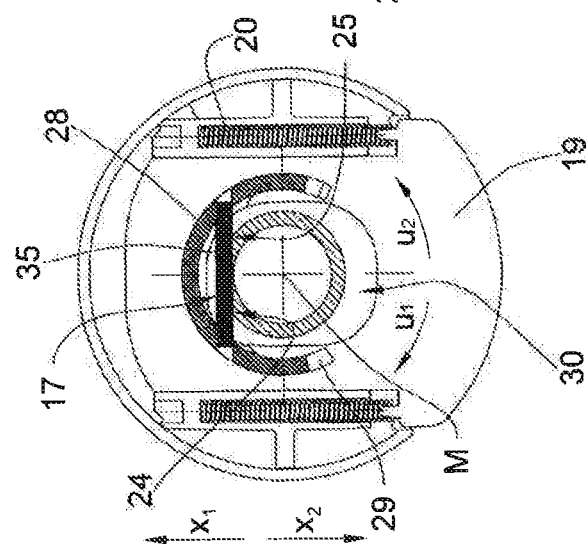

HEADREST

FIELD OF THE INVENTION

The invention relates to a headrest for a vehicle seat. Within the meaning of the invention a vehicle seat may be a seat in a land vehicle, aircraft or watercraft.

BACKGROUND OF THE INVENTION

Such a headrest is known from public prior use. The headrest comprises a head box with a head contact face supported by support rods on the seat back of a vehicle seat. Each support rod is held with one end in a bearing of the head box and with another end in guides fixed to the seat back. The headrest has a latch that can lock the support rod in at least one vertical position relative to the guide. The latch is formed by at least one notch in the support rod as well as a latch element held on the guide.

In the event of an accident, in particular a rear-end collision, deformation of the seat back of the vehicle seat frequently occur, and the guide rotates relative to the support rod and the latch element moves out of the notch. Thus the latching of the support rod is no longer ensured. Safety regulations require that the latching of the support rod always be ensured even in the event of deformation of the seat back.

OBJECT OP THE INVENTION

It is the object of the invention to create a headrest with a latch that ensures that even in the event of a relative rotation of the support rod with respect to the guide the support rod is securely latched.

SUMMARY OF THE INVENTION

The headrest according to the invention has a head box with a head contact face that serves as an abutment for the head of a seat occupant. The head box is provided with upholstery. The head box can be mounted by at least one support rod on a vehicle seat, in particular on the seat back of the vehicle seat.

At least one end of the support rod is received in a bearing carried on the head box or the vehicle seat. For example, the support rod is mounted with one end in a bearing of the head box and with another end in a bearing fixed in the vehicle seat. According to an alternative embodiment the head box is mounted on a support rod clip, and a crosspiece connecting the free ends of the support rods is mounted in a bearing of the head box and each free end is mounted in a bearing of the vehicle seat.

The support rod can be designed, for example, to be movable relative to the bearing.

The support rod can be releasably latched with regard to at least one bearing by a latch. The latch is movable between a latching position and a release position. In the latching position movement of the support rod relative to the bearing is prevented in at least one axial direction. In the release position axial movement of the support rod relative to the bearing is possible. The latch is formed by a notch that extends angularly across part of the outer surface of the support rod and is usually called a support rod notch, and by a latch element carried by the bearing.

The latch element has a latching part with a contact face engaging the support rod. The notch has, for example, a floor and at least one locking flank. The locking flank prevents, for example, a height adjustment of the support rod in a specific direction. The locking flank extends, for example, approximately at a right angle to a longitudinal central axis of the support rod. The floor forms, for example, a stop for the latch element acting radially with respect to the longitudinal central axis of the support rod. The notch is, for example produced by milling or embossing.

According to the first aspect of the invention the latch element is movably mounted. Normally the latch element is located in a starting position in which it can be moved between the latching position and the release position. If the latch element is located in the latching position and there is relative rotation between the support rod and the bearing, the latch element moves out of a starting position into one of a plurality of crash positions. In this way the engagement of the latch element with the notch is maintained and the latching the support rod in the bearing continues to be ensured.

The latch element is, for example, pivotal about a pivot axis. This can include embodiments in which the latch element is mounted by a pivot joint or, alternatively, also embodiments in which the latch element or a support of the latch element is guided by a guide on a circular path in such a way that it can pivot about a pivot axis.

According to one embodiment, the latch element is carried by a support pivotal about a pivot axis. This has the advantage that the characteristics of the support and the characteristics of the latch element are independent of one another. For example, the support can be designed in such a way that it has good sliding characteristics with regard to its shape and/or its material, whereas the latch element is designed so that a transmission of force from the support rod to the bearing is ensured.

According to the second aspect of the invention, the latch element has a latching part with a contact face for contact with the notch, and the contact face is convex with respect to its longitudinal extent. In other words, in the center the latching part projects further with respect to the support rod than on the edges. Additionally, or alternatively, for example, the floor of the notch can also be formed with a convex curve with respect to a longitudinal central axis of the support rod.

The following embodiments are relevant for both aspects of the invention.

The latch element is, for example, carried by a movable element held on the guide so as to be movable between the latching position and the release position. The movable element is, for example, movable approximately at right angles to a longitudinal central axis of the support rod. The movable element has, for example, a hole through which the support rod passes. In this case the movable element can be guided over a greater surface area on the bearing. The movable element can be formed, for example, as a slide movable in a straight line.

A biasing element urges the movable element, for example, into the latching position. In this way the slide can move back automatically into the latching position if the slide is not actuated. The slide is, for example, movable into the release position if the slide is actuated.

The latch element has, for example, at least one support part fixed or movable on the slide. In order to ensure unhindered engagement in the notch, the slide has at least one support part and a latching part. The latching part is, for example, between two support parts. The support parts can be, for example, fixed to the slide or to a support movable relative to the support or according to an alternative embodiment can be movable in guides of the slide.

The latch element is formed, for example, from a bar-shaped element. This can be straight or freely shaped. According to an alternative the latch element is formed, for example, by a plate.

Materials that may be considered for the latch element are, for example, metal or plastic, as well as composite materials. The latch element may be formed, for example, by a metal wire or a metal plate.

BRIEF DESCRIPTION OF THE DRAWING

Further advantages are disclosed with reference to embodiments illustrated in the drawings. In the drawings:

FIG. 1 is a perspective view of a headrest according to the invention with support rods mounted in a guide, FIG. 2 is a front view of the headrest according to FIG. 1, FIG. 3a is a sectional view along the section line IIIa-IIIa in FIG. 1 showing the latch in the latching position, FIG. 3b shows, like FIG. 3a, the latch in the release position, FIG. 3c shows, like FIG. 3a, the latch in the release position but with the support rod rotated relative to the bearing, FIGS. 4a to 4c show a second embodiment of the latch, FIGS. 5a to 5c show a third embodiment of the latch, FIGS. 6a to 6c show a fourth embodiment of the latch.

SPECIFIC DESCRIPTION OF THE INVENTION

Figure 7C:
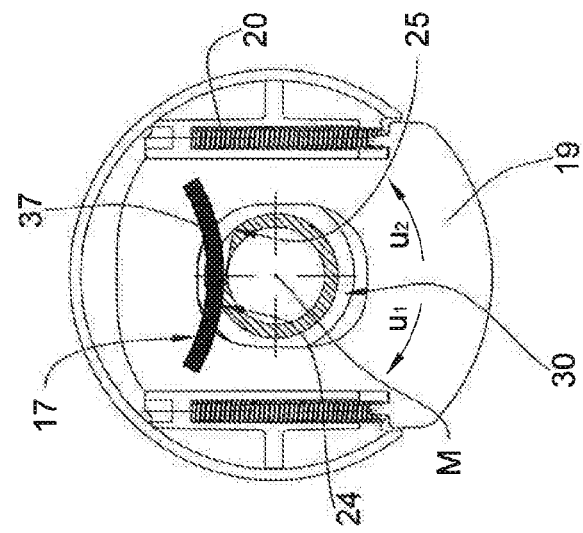
FIGS. 7a to 7c show a fifth embodiment of the latch.

A headrest as a whole is designated in the drawings at 10. The same reference numerals in the different figures designate the same parts, even if with lower-case letters.

The headrest 10 has a cushioned head box 11 as well as support rods 12. The head box 11 is provided with a head contact face 13 that serves as an abutment for the head of a seat occupant (not shown). Each support rod 12 is mounted in a respective guide 14. A latch 15 can fix at least one of the support rods 12 in the respective guide 14 in such a way that it is not movable relative to the guide 14 in the direction $z_1$ or $z_2$.

The latch 15 has at least one notch 16, in particular a plurality of notches 16 formed in the tubular support rod 12, in order to lock the head box in different vertical positions. The notch 16 is formed in the support rod 12 for example by embossing or milling and forms a secantal cutout with respect to a cylindrical outside surface 18 of the support rod 12. Furthermore, the latch 15 has a latch element 17 (see FIG. 3a) mounted in the guide 14.

In FIG. 3a the latch element 17 is in a starting position. The latch element 17 has a latching part 22 as well as support parts 23a and 23b by which the latch element 17 is held in a slide 19. The latch element 17 is mounted in this slide 19. The latching part 22 extends across a hole 30 formed in the slide 19 and through which the support rod 12 passes.

The slide 19 is movable in a straight line in directions $x_1$ and $x_2$. From the latching position illustrated in FIG. 3a the slide 19 can be moved in the direction $x_1$ into a release position according to FIG. 3b and the slide 19 can be moved back out of the release position in the direction $x_2$ into the latching position. Two compression springs 20 urge the slide 19 in the direction $x_2$ into the latching position in which the latch element 17 is engaged in one of the notches 16.

For height adjustment of the head box 11 the slide 19 is moved in the direction $x_1$ into the release position, whereby the latch element 17 is disengaged from the notch 16. The support rod 12 can then be moved in the direction $z_1$ or in the direction $z_2$. In this embodiment, the notches 16 are designed in such a way that movement of the support rod 12 in the direction $z_1$ is also possible without an adjustment of the slide 19 into the release position.

In the latching position a latching flank 38 of the notch 16 extending approximately at a right angles to the longitudinal central axis of the respective support rod 12 and thus prevents movement of the support rod 12 in the direction $x_2$.

If the slide 19 is no longer actuated, it moves automatically due to the return force of the compression spring 20 in the direction $x_2$ either into the latching position with the latch element 17 seated in one of the notches 16 or with the latch element 17 in contact with the external surface 18 of the support rod 12. If the head box 11 is then displaced somewhat in the direction $z_1$ or $z_2$, the slide 19 moves into the latching position in one of the adjacent notches.

Due to accidents, substantial loads frequently occur on the vehicle seat or on the head box 11, inducing a rotation of the support rod relative to the guide 14 in the direction $u_1$ or $u_2$. With the solution according to the invention this rotation does not lead to the latch element 17 moving out of engagement with the notch 16.

According to the embodiment illustrated in FIGS. 3a to 3c, the latch element 17 is mounted in such a way that, even in the event of a relative rotation between the guide 14 and the support rod 12, a latching part 22 of the latch element bears against a floor 21 of the notch 16. The latch element 17 can pivot about a center point M on the slide 19. The support parts 23a and 23b formed on both sides of the latching part 22 are formed as annular segments and are supported in complementary slide seats 39a and 39b of the slide 19 that serve as guides. In this way the latch element 17 can pivot about the center point M.

If the support rod 12 pivots relative to the guide 14 about an angle α (see FIG. 3c), an end 24 of the floor 21 initially comes into contact with the latching part 22 and due to the compression springs 20 a spring force F directed parallel to the compression springs 20 and in the direction $x_1$ acts on the latch element 17. A portion of the force F urges the latch element 17 in the direction $u_1$ and twists it in the direction $u_1$. The torque acting on the latch element in the direction $u_1$ is cancelled if a balance of forces is set and the latching part 22 has been fully seated on the floor 21, as illustrated in FIG. 3c.

For the sake of completeness, it may be mentioned that in the event of pivoting of the support rod 12 in the direction $u_2$, the contact of the latch element 17 with an end 25 of the floor 21 would cause a torque in the direction $u_2$, but this is not illustrated. In the following embodiments only a rotation of the support rod 12 in the direction $u_1$ is also described. Nevertheless, the engagement between the latch element 17 and the notch 16 is maintained even in the event of rotation of the support rod 12 in the direction $u_2$.

The second embodiment shown in FIGS. 4a to 4c differs from the first embodiment only in that the latch element 17 is shaped differently and is mounted on the slide 19 in a different way. In this embodiment the latch element 17 is shaped like a staple 36, and the bearing segments 23a and 23b engage around pins 32 of the slide 19. Thus the latch element 17 can only move to a limited extent in the direction $x_1$. The bearing segments 23a and 23b rest against a surface 26 of circular segmental shape centered on the point M. In FIG. 4a the slide 19 is in the latching position and the latch element 17 is in the starting position.

In this embodiment a force F caused by the compression springs 20 and exerted on the latch element 17 by the end 24 generates a torque in the direction $u_1$ and twists the latch element 17 into the position illustrated in FIG. 4c. In this position with respect to the forces exerted on the latch element by the compression springs 20 there is a balance of forces and the latching part 22 is seated in the notch 16.

The third embodiment illustrated in FIGS. 5a to 5c differs from the first embodiment in that the latch element 17 is shaped as a generally triangular plate 33 in this example and is movable within the limits of a recess 34. The plate is pivotal about an axis a and has a contact face 27 for contact with the rod notch. The latching part 27 extends across the hole 30 of the slide 19 through which the support rod 12 passes.

If during relative rotation of the support rod 12 with respect to the guide 14 a force F is exerted on the contact face 27 in the direction $u_1$ by the end 24 and causes a torque about the axis a in the direction $u_1$, the latch element 17 pivots in the direction $u_1$ about the axis a until a balance of forces is produced. The is the case if the contact face 27 has been applied to the floor 21. In this way the latch element 17 remains seated in the notch 16 (see FIG. 5c).

A fourth embodiment illustrated in FIGS. 6a to 6c differs from the first embodiment only in that a straight latch element 17 designed as a bar is mounted on a part-circular support 28. The latch element 17 is immovable relative to the support 28. The support parts 23a and 23b are retained in a hole 31 in the support 28 whereas the latching part 22 extends across the hole 30 through which the support rod 12 passes. The support 28 is received in a corresponding slide seat 29 that forms a guide for the support 28, in such a way that it is pivotal to a limited extent about the center point M. In this case the support 28 slides in the notch 29.

In FIG. 6a the support rod 12 and the guide 14 are in their undeformed starting position. In FIG. 4a the slide 19 is in the latching position and the latch element 17 is in the starting position. FIG. 6b shows the latch element 17 in the release position.

If in the latching position a force F is exerted by an end 24 on the latch element 17, the force F is transmitted to the support 28 and generates a torque in the direction $u_1$ in the support 28. In FIG. 6c the support rod 12 is rotated in the direction $u_1$ with respect to the guide 14. The force F exerted on the latch element 17 by the end 24 has rotated the support 28 in the direction $u_1$. According to FIG. 6c a balance of forces has been established. The latch element rests on both ends 24 and 25 and is located in the latching position seated in the notch 16.

Figure 7B:
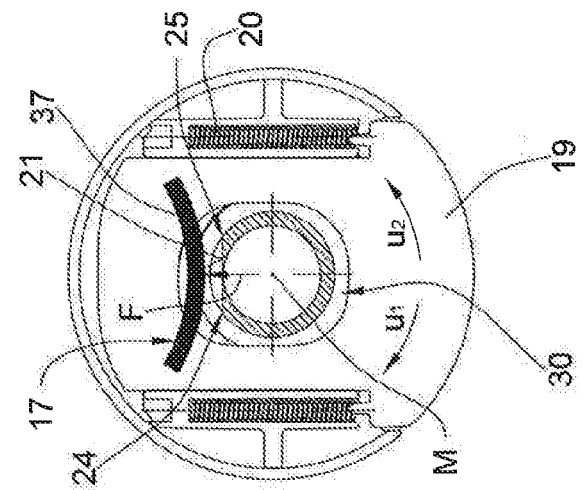
Figure 7A:
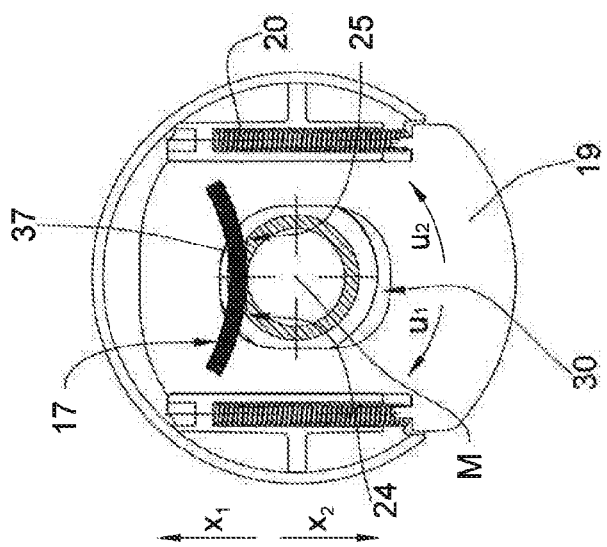

In the embodiment according to the FIGS. 7a to 7c the latch element 17 is mounted fixedly in the slide 19. The latch element 17 is formed as an arcuate rod 37, and the latching part 22 is curved in the middle toward the support rod 12. The support parts 23a and 23b are fixed in the slide 19. The latching part 22 extends across the hole 30. In FIG. 7a the support rod 12 and the guide 14 are in the undeformed starting position. The slide 17 is in the latching position. In FIG. 7b the latch element 17 is in the release position.

FIG. 7c shows a support rod 12 rotated in the direction $u_1$ relative to the guide 14. Due to the convex shape of the latching part 22 the latch element 17 maintains sufficient engagement in the notch 16 so that the locking of the support rod 12 is ensured. Due to the shape of the latching part 22, with a rotation of the support rod 12 a sufficient coverage of the latching part 22 and a locking surface 38 of the notch 16 is maintained.

The invention claimed is:

1. A headrest comprising:
   a head box;
   a support rod securing the head box to a vehicle seat and rod having one end;
   a bearing receiving the one end and carried on the head box or the vehicle seat;
   a latch releasably securing the support rod to the bearing and movable between a latching position and a release position and comprised of at least one notch extending angularly on an outer surface of the support rod and a latch element carried by the bearing and movably mounted so that in the latching position, in the event of a relative rotation between the support rod and the bearing, the latch element is movable out of a starting position into at least one crash position; and
   a pivot or guide constraining movement of the latch element to a circular path.

2. The headrest according to claim 1, wherein the latch element is carried by a movable element held on the bearing so as to be movable along the path between the latching position and the release position.

3. The headrest according to claim 2, wherein the movable element is urged by a biasing element into the latching position.

4. The headrest according to claim 2, wherein the movable element is a slide.

5. The headrest according to claim 2, wherein the latch element has support parts mounted fixedly or movably on the movable element.

6. The headrest according to claim 1, wherein the latch element is formed by a wire or a plastic element.

* * * * *